United States Patent [19]

El Sayed et al.

[11] Patent Number: 5,576,377
[45] Date of Patent: Nov. 19, 1996

[54] POLYMER MOULDING MATERIALS FOR PRODUCING A PARTIAL COLOR CHANGE BY LASER ENERGY, PARTICULARLY FOR THE PRODUCTION OF COLORED MARKINGS

[75] Inventors: Aziz El Sayed, Leverkusen; Frank Gerling, Düsseldorf; Salvatore Messina, Rheda-Wiedenbrück; Herbert Magerstedt, Moers; Karsten-Josef Idel, Krefeld; Edgar Ostlinning, Düsseldorf, all of Germany

[73] Assignee: Bayer AG, Leverkusen, Germany

[21] Appl. No.: 406,493

[22] Filed: Mar. 20, 1995

[30] Foreign Application Priority Data

Mar. 30, 1994 [DE] Germany .......................... 44 11 067.7

[51] Int. Cl.⁶ ................ C08K 3/04; C08J 3/28; C08F 2/46
[52] U.S. Cl. ..................... 524/495; 524/515; 524/570; 106/472; 522/2; 523/300
[58] Field of Search .................... 524/495, 515, 524/570; 106/472; 522/2; 523/300

[56] References Cited

U.S. PATENT DOCUMENTS 5,350,792  9/1994  Hess et al. .......................... 524/417

FOREIGN PATENT DOCUMENTS

| 1284125 | 5/1991 | Canada . |
| 101667 | 2/1984 | European Pat. Off. . |
| 327508 | 8/1989 | European Pat. Off. . |
| 641821 | 3/1995 | European Pat. Off. . |

*Primary Examiner*—Kriellion Morgan
*Attorney, Agent, or Firm*—Connolly & Hutz

[57] ABSTRACT

The present invention relates to colored polymer moulding materials which give rise to colored markings on a dark background with a very high contrast ratio on the absorption of laser energy.

6 Claims, No Drawings

5,576,377

POLYMER MOULDING MATERIALS FOR PRODUCING A PARTIAL COLOR CHANGE BY LASER ENERGY, PARTICULARLY FOR THE PRODUCTION OF COLORED MARKINGS

The present invention relates to coloured polymer moulding materials which give rise to coloured markings on a dark back ground with a very high contrast ratio on the absorption of laser energy.

Laser inscription for marking and decorating plastic moulding materials is assuming increasing importance. In addition to its economy compared with conventional inscription methods, laser inscription offers a high degree of flexibility as regards the type, size and design of lettering, irrespective of the batch size. The marking of electrical/electronic components, key leads and housings is a classical application for laser inscription.

The following possibilities have been described for marking plastics by means of laser inscription:

1. Dark Markings on a Light Background

A polymer matrix is coloured using light colorants—pigments or dyes. During laser inscription the polymer matrix/the colorant is partially carbonized due to the absorption of laser energy. This produces a dark coloration of the light polymer matrix. This method is restricted to polymers which tend to carbonize.

The contrast ratios which can b obtained by this means are insufficient for many fields of application. The addition of colorants which change their colour due to the absorption of laser energy is described in EP 0 190 997. Thus polybutylene terephthalate is coloured red With iron oxide, for example. Laser inscription produces dark markings on a red background. The contrast ratio has proved to be insufficient.

2. Light Markings on a Dark Background

Polymers, colorants or additives which tend to foam due to the absorption of laser energy have been proven, in practice for this type of inscription. Foaming gives rise to light characters on a dark background. The contrast ratios which can be obtained are insufficient for many fields of application (e.g. EP-A 522 370).

Surprisingly, it has been found that coloured markings can be obtained on a dark background by the absorption of laser energy by means of a combination of organic colorants with inorganic pigments of the same colour or with titanium dioxide and carbon black.

The polymer matrix becomes black when a suitable carbon black concentration is used. At a lower concentration of carbon black, coloured lettering is obtained on a dark background which is the same colour (difference in tone).

The present invention relates to colored polymer moulding materials consisting of:

| | | |
|---|---|---|
| A. | 0.1 to 3 weight % | colorant combination |
| B. | 50 to 99.9 weight % | polymer matrix |
| C. | 0 to 50 weight % | reinforcement materials |
| D. | 0 to 20 weight % | elastomeric modifier, |
| E. | 0 to 20 weight % | flame retardant additives, and |
| F. | 0 to 2 weight % | processing additives, | characterized in that colorant combination A consists of 0.04 to 2.0 weight % of an organic dye, 0.05 to 2.0 weight % of an inorganic pigment, and 0.01 to 1.0 weight % of carbon black.

The polymer materials are suitable for the production of coloured markings on a dark background by means of a laser.

The present invention also relates to the use of the coloured polymers for the production of moulded articles which can be inscribed by means of a laser.

The polymer moulding materials according to the invention are produced in commercially available single-shaft and twin-shaft extruders. Metered additions of the colorants are made as a powder mixture or as a concentrated colorant. The moulded components are produced in commercially available injection moulding machines.

Mixtures comprising organic dyes/pigments with inorganic pigments of the same colour and carbon black are suitable as colorant combination A of the moulding materials according to the invention. Examples of colorant combinations are:

Filamid yellow/light yellow 8G/carbon black,

Filamid red GR/light yellow 6R/carbon black,

Ultramarine blue 690/light blue 100/carbon black,

Heliogen green K 8730/light green 5G/carbon black,

Heliogen blue K 6911D/light blue 100/carbon black,

Titanium Dioxide/zinc sulphide/carbon black,

Macrolex fluorescent yellow 10 GN/light green 5G/carbon black,

LISA yellow 57Y/light yellow 8G/carbon black,

LISA red 61R/light yellow 6R/carbon black,

Macrolex fluorescent yellow 10 GN/Bayertitan RKB2/carbon black,

LISA red 61R/Bayertitan RKB2/carbon black.

Mixtures of various organic pigment can also be used, such as Filamid red GR + filamid yellow R/light yellow 8G/carbon black, for example.

In component A the concentration of the organic colorants/pigments is between 0.04 and 2.0 weight %, preferably 0.1 to 0.5 weight %, the concentration of inorganic pigments is 0.05 to 1.0 weight %, preferably 0.01 to 0.5 weight %, and the concentration of carbon black is between 0.05 and 2.0 weight %, preferably 0.01 to 0.4 weight %.

The moulding materials according to the invention may contain 0.1 to 3 weight % of a combination of organic dyes/pigments + inorganic pigments of the same colour.

Polymers in an amount of 50 to 99.9, weight % are suitable as polymer matrix B for the moulding materials according to the invention, e.g. polymers based on polyamide, polyimide, polyamide imide, polyester, polycarbonate, polyester carbonate, polyether, polyether ketones, polyacrylates, polymethacrylates, ABS, polyolefines such as polyethylene or polypropylene, polystyrene, polyvinyl chloride, polyoxymethylene, polysulphones, polyester sulphones, polyphenylene sulphide, silicones, rubbers, etc.

Commercially available glass fibres and/or mineral fibres and/or mineral fillers such as kaolin, wollastonite, French chalk, chalk, etc., are used as reinforcement C. of the moulding materials according to the invention.

Commercially available EP(D)M rubbers, graff rubbers based on acrylonitrile-butadienestyrene, acrylate rubbers, polyurethanes or EVA (ethylene-vinyl acetate) copolymers with or without functional coupling groups are used as elastomeric modifier D according to this invention. Those based on organic halogen, nitrogen and phosphorus compounds may also be used.

Commercially available organic compounds or halogen compounds with synergists or commercially available organic nitrogen compounds or organic/inorganic phosphorus compounds are used as flame retardant additives E. Mineral flame retardant additives such as Mg hydroxide or Ca Mg carbonate hydrate may also be used.

Processing additives F. consist of commercially available internal lubricants, stabilizers, demoulding agents and nucleating agents.

Commercially available laser systems, preferably solid Nd-YAG systems, can be used as energy sources for inscription and marking. The wavelength may lie between 193 nm and 10,600 nm, and is preferably 1064 nm.

The usual equipment components to which inscriptions are applied, e.g. housings, keyboards, fittings, lettered panels, illuminated panels, etc., can be produced from the moulding materials according to the invention.

EXAMPLES

The following products were used i0 the Examples:
Polyamide 6 (Durethan B 31SK® manufactured by Bayer AG),
Glass fibre-reinforced (30%) polyamide 66 (Durethan AKV 30 H® manufactured by Bayer AG),
Polybutylene terephthalate (Pocan 1506® manufactured by Bayer AG),
Polycarbonate (Makrolon 2800® manufactured by Bayer AG),
ABS (Novodur P2H® manufactured by Bayer AG),
PMMA (Plexiglas 7N® manufactured by Röhm GmbH, Darmstadt),
Bayertitan RKB-2® manufactured b Bayer AG
Light yellow 8G®, light blue 100® and light green 5G® manufactured by Bayer AG,
Filamid yellow R® manufactured by Ciba Geigy
Filamid red GR® manufactured by Ciba Geigy,
Heliogen green K 8730® manufactured by BASF,
Heliogen blue 6911D® manufactured by BASF,
Ultramarine blue 690® manufactured by Nubiola,
Macrolex fluorescent yellow 10 GN® manufactured by Bayer AG,
LISA yellow 57Y® manufactured by Bayer AG,
LISA red 61R® manufactured by Bayer AG,
Carbon black (Printex 300®/Degussa), (Raven 2000®/Rhein Chemie), Microlen schwarz® (Ciba Geigy)
Sachtolith® manufactured by Sachtleben.

EXAMPLES 1 to 8 (TABLE 1)

The dyes were premixed with the granulated material and extruded and granulated using a twin-shaft worm kneader. The granular material obtained was injection moulded into slabs in an Arburg injection moulding machine and inscribed using a FOBALLAS ND-YAG laser.

Depending on the carbon black concentration, coloured characters were produced on a black background or coloured characters were produced on a dark background of the same colour (difference in tone). A the characters and symbols were characterized by very good contrast.

EXAMPLES 9 to 16 (TABLE 2)

Examples 1 to 8 were repeated with glass fibre-reinforced PA 66 (AKV 30 H). Coloured characters and symbols with a very good contrast ratio were also obtained here.

EXAMPLES 17 to 24 (TABLE 3)

Examples 1 to 8 were repeated with polyester (polybutylene terephthalate). Coloured characters and symbols with a very good contrast ratio were obtained.

EXAMPLES 25 to 32 (TABLE 4)

The dyes were premixed with polycarbonate or granulated PMMA and extruded and granulated using a twin-shaft worm kneader. The granular material obtained was injection moulded into slabs in an Arburg injection moulding machine and inscribed using a FOBALLAS ND-YAG laser. Coloured characters and symbols with a good contrast ratio were also obtained here.

TABLE 1

| Example | | 1 | 2 | 3 | 4 | 5 | 6 | 7 | 8 |
|---|---|---|---|---|---|---|---|---|---|
| Durethan B 31 SK | | 99.5 | 99.6 | 99.65 | 99.6 | 99.6 | 99.6 | 99.6 | 99.65 |
| Filamid yellow R | % | 0.2 | 0.2 | 0.2 | | | | | |
| Filamid red GR | % | | | | 0.2 | | | | |
| Heliogen green K 8730 | % | | | | | 0.2 | | | |
| Ultramarine blue 690 | % | | | | | | 0.2 | | |
| Heliogen blue K 6911D | % | | | | | | | 0.2 | 0.2 |
| Light yellow 8G | % | 0.1 | 0.1 | 0.1 | | | | | |
| Light yellow 5R | % | | | | 0.1 | | | | |
| Light green | % | | | | | 0.1 | | | |
| Light blue 100 | % | | | | | | 0.1 | | |
| Bayertitan RKB 2 | % | | | | | | | 0.1 | 0.1 |
| Sachtolith | % | | | | | | | | |
| Carbon black | % | 0.2 | 0.1 | 0.05 | 0.1 | 0.1 | 0.1 | 0.1 | 0.05 |
| Contrast | | very good | very good | very good | very good | very good | very good | very good | very good |
| Inscription colour | | yellow | yellow | yellow | red | green | blue | light blue | light blue |
| Background colour | | black | dark brown | brown | dark brown | dark green | dark blue | dark blue | blue |

TABLE 2

| Example | | 9 | 10 | 11 | 12 | 13 | 14 | 15 | 16 |
|---|---|---|---|---|---|---|---|---|---|
| AKV 30 H | | 99.5 | 99.6 | 99.65 | 99.6 | 99.6 | 99.6 | 99.6 | 99.65 |
| Filamid yellow R | % | 0.2 | 0.2 | 0.2 | | | | | |
| Filamid red GR | % | | | | 0.2 | | | | |
| Heliogen green K 8730 | % | | | | | 0.2 | | | |
| Ultramarine blue 690 | % | | | | | | 0.2 | | |
| Heliogen blue K 6911D | % | | | | | | | 0.2 | 0.2 |
| Light yellow 8G | % | 0.1 | 0.1 | 0.1 | | | | | |
| Light yellow 5R | % | | | | 0.1 | | | | |
| Light green | % | | | | | 0.1 | | | |
| Light blue 100 | % | | | | | | 0.1 | | |
| Bayertitan RKB 2 | % | | | | | | | 0.1 | 0.1 |
| Sachtolith | % | | | | | | | | |
| Carbon black | % | 0.2 | 0.1 | 0.05 | 0.1 | 0.1 | 0.1 | 0.1 | 0.05 |
| Contrast | | very good | very good | very good | very good | very good | very good | very good | very good |
| Inscription colour | | yellow | yellow | yellow | red | green | blue | light blue | light blue |
| Background colour | | black | dark brown | brown | black | dark green | dark blue | dark blue | blue |

TABLE 3

| Example | | 17 | 18 | 19 | 20 | 21 | 22 | 23 | 24 |
|---|---|---|---|---|---|---|---|---|---|
| Pocan 1506 | | 99.5 | 99.6 | 99.65 | 99.6 | 99.6 | 99.6 | 99.6 | 99.65 |
| Filamid yellow R | % | 0.2 | 0.2 | 0.2 | | | | | |
| Filamid red GR | % | | | | 0.2 | | | | |
| Heliogen green K 8730 | % | | | | | 0.2 | | | |
| Ultramarine blue 690 | % | | | | | | 0.2 | | |
| Heliogen blue K 6911D | % | | | | | | | 0.2 | 0.2 |
| Light yellow 8G | % | 0.1 | 0.1 | 0.1 | | | | | |
| Light yellow 5R | % | | | | 0.1 | | | | |
| Light green | % | | | | | 0.1 | | | |
| Light blue 100 | % | | | | | | 0.1 | | |
| Bayertitan RKB 2 | % | | | | | | | 0.1 | 0.1 |
| Sachtolith | % | | | | | | | | |
| Carbon black | % | 0.2 | 0.1 | 0.05 | 0.1 | 0.1 | 0.1 | 0.1 | 0.05 |
| Contrast | | very good | very good | very good | very good | very good | very good | very good | very good |
| Inscription colour | | yellow | yellow | yellow | red | green | blue | light blue | light blue |
| Background colour | | black | dark brown | brown | brown | dark green | dark blue | blue | blue |

TABLE 4

| Example | | 25 | 26 | 27 | 28 | 29 | 30 | 31 | 32 |
|---|---|---|---|---|---|---|---|---|---|
| Makrolon 2800 | | 99.65 | 99.65 | 99.65 | | | | 99.65 | 99.65 |
| Macrolex fluorescent yellow 10 GN | % | 0.5 | | | 0.05 | | | 0.05 | |
| LISA yellow 57 Y | % | | 0.05 | | | 0.05 | | | 0.05 |
| LISA red 61 R | % | | | 0.05 | | | 0.05 | | |
| Plexiglas 7 N | % | | | | 99.65 | 99.65 | 99.65 | | |
| Light yellow 8G | % | | 0.1 | | | 0.1 | | 0.2 | 0.2 |
| Light yellow 5R | % | | | 0.1 | | | 0.1 | | |
| Light green | % | 0.1 | | | 0.1 | | | | |
| Light green | % | | | | | | | 0.1 | 0.1 |
| Bayertitan RKB 2 | % | | | | | | 0.1 | | |
| Carbon black | % | 0.2 | 0.2 | 0.2 | 0.2 | 0.2 | 0.2 | 0.2 | 0.2 |
| Contrast | | very good | very good | very good | very good | very good | very good | very good | very good |
| Inscription colour | | greenish | yellowish | reddish | greenish | yellowish | reddish | greenish | yellowish |
| Background colour | | green | brown | brown | green | brown | brown | green | brown |

We claim:

1. A laser-inscribable polymer molding material comprising a polymer selected from the group consisting of polyamide, polyester, polycarbonate, polyester carbonate, polymethacrylate, BS, polystyrene, polyoxymethylene and polyolefin, and 0.1 to 3% by weight of a colorant combination containing an organic dye or pigment, an inorganic pigment of the same color, and carbon black, wherein the polymer molding material has an initial color and further wherein portions of the polymer molding compound that have absorbed laser energy have the same color as said initial color but a lighter tone than portions of the polymer molding material that have not absorbed said laser energy.

2. The molding material of claim 1 wherein the colorant combination consists of 0.04 to 2.0% by weight of said organic dye or pigment, 0.05 to 2.0% by weight of inorganic pigment, and 0.01 to 1.0% by weight of carbon black.

3. The molding material of claim 1, wherein the molding material additionally contains up to 50% by weight reinforcing materials, up to 20% by weight elastomeric modifier, up to 20% by weight flame retardant additives, and/or up to 2% by weight processing additives.

4. The molding material of claim 1, wherein the colorant combination consists of a mixture of two or more organic dyes or pigments, an inorganic pigment of the same color and carbon black.

5. The molding material of claim 1, wherein the laser energy has a wavelength of from 193 nm to 10,600 nm.

6. The molding material of claim 1, wherein the laser energy has a wavelength of from 193 nm to 1064 nm.

* * * * *

UNITED STATES PATENT AND TRADEMARK OFFICE
CERTIFICATE OF CORRECTION

PATENT NO. : 5,576,377
DATED : November 19, 1996
INVENTOR(S) : El Sayed, et al.

It is certified that error appears in the above-indentified patent and that said Letters Patent is hereby corrected as shown below:

In Column 5, line 64 (Claim 1), "BS" should be --ABS--.

Signed and Sealed this

Fifteenth Day of July, 1997

Attest:

BRUCE LEHMAN

*Attesting Officer*  *Commissioner of Patents and Trademarks*